United States Patent
Needham et al.

(10) Patent No.: US 9,729,920 B2
(45) Date of Patent: Aug. 8, 2017

(54) ATTENTION ESTIMATION TO CONTROL THE DELIVERY OF DATA AND AUDIO/VIDEO CONTENT

(71) Applicant: General Instrument Corporation, Horsham, PA (US)

(72) Inventors: Michael L. Needham, Palatine, IL (US); Kevin L. Baum, Rolling Meadows, IL (US); Faisal Ishtiaq, Chicago, IL (US); Renxiang Li, Lake Zurich, IL (US); Shivajit Mohapatra, Arlington Heights, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 247 days.

(21) Appl. No.: 13/840,342

(22) Filed: Mar. 15, 2013

(65) Prior Publication Data

US 2014/0282642 A1    Sep. 18, 2014

(51) Int. Cl.
*H04N 21/442*    (2011.01)
*H04N 21/41*    (2011.01)
(Continued)

(52) U.S. Cl.
CPC . *H04N 21/44218* (2013.01); *H04N 21/23418* (2013.01); *H04N 21/25891* (2013.01);
(Continued)

(58) Field of Classification Search
CPC .. H04H 60/33; H04H 60/46; H04N 21/44218; H04N 21/6582;
(Continued)

(56) References Cited

U.S. PATENT DOCUMENTS 6,889,382 B1    5/2005 Anderson
7,022,075 B2    4/2006 Grunwald et al.
(Continued)

FOREIGN PATENT DOCUMENTS

EP    2282543 A2    2/2011
GB    2361128 A    10/2001
(Continued)

OTHER PUBLICATIONS

A. Carr, "With AmEx Partnership, Foursquare May Prove Social Media's Real ROI," accessed at http://www.fastcompany.com/1762726/amex-partnership-foursquare-may-prove-social-medias-real-roi, accessed on May 2, 2013.
(Continued)

*Primary Examiner* — Benjamin R Bruckart
*Assistant Examiner* — Jen-Shi Huang
(74) *Attorney, Agent, or Firm* — Stewart M. Wiener (57) ABSTRACT

A method implemented in a computer system for controlling the delivery of data and audio/video content. The method delivers primary content to the subscriber device for viewing by a subscriber. The method also delivers secondary content to the companion device for viewing by the subscriber in parallel with the subscriber viewing the primary content, where the secondary content relates to the primary content. The method extracts attention estimation features from the primary content, and monitors the companion device to determine an interaction measurement for the subscriber viewing the secondary content on the companion device. The method calculates an attention measurement for the subscriber viewing the primary content based on the attention estimation features, and the interaction measurement, and controls the delivery of the secondary content to the companion device based on the attention measurement.

21 Claims, 3 Drawing Sheets

(51) Int. Cl.
*H04N 21/234* (2011.01)
*H04N 21/258* (2011.01)
*H04N 21/262* (2011.01)
*H04N 21/43* (2011.01)
*H04N 21/6543* (2011.01)
*H04N 21/81* (2011.01)

(52) U.S. Cl.
CPC ....... *H04N 21/262* (2013.01); *H04N 21/4104* (2013.01); *H04N 21/4307* (2013.01); *H04N 21/44213* (2013.01); *H04N 21/6543* (2013.01); *H04N 21/8133* (2013.01)

(58) Field of Classification Search
CPC ....... H04N 21/23418; H04N 21/25891; H04N 21/44213; H04N 21/8133
USPC ........... 725/9, 10, 14, 21, 40, 42, 43, 46, 48
See application file for complete search history.

(56) References Cited

U.S. PATENT DOCUMENTS

| | | |
|---|---|---|
| 7,126,939 B2 | 10/2006 | Barany et al. |
| 7,284,201 B2 | 10/2007 | Cohen-Solal |
| 7,289,606 B2 | 10/2007 | Sibal et al. |
| 7,365,651 B2 | 4/2008 | Massey et al. |
| 7,460,940 B2 | 12/2008 | Larsson et al. |
| 7,822,783 B2 | 10/2010 | Carrabis |
| 7,882,145 B2 | 2/2011 | Shenfield |
| 7,890,849 B2 | 2/2011 | Moraveji et al. |
| 7,908,172 B2 | 3/2011 | Corts et al. |
| 8,060,904 B1 | 11/2011 | Evans et al. |
| 8,484,676 B1 | 7/2013 | Narsimhan et al. |
| 8,763,042 B2 | 6/2014 | Ishtiaq et al. |
| 2002/0026359 A1 | 2/2002 | Long et al. |
| 2002/0144259 A1 | 10/2002 | Gutta et al. |
| 2003/0014491 A1 | 1/2003 | Horvitz et al. |
| 2003/0018969 A1 | 1/2003 | Humpleman et al. |
| 2003/0097659 A1 | 5/2003 | Goldman |
| 2003/0135539 A1 | 7/2003 | Kondo et al. |
| 2004/0158859 A1 | 8/2004 | Aoyama et al. |
| 2005/0060745 A1 | 3/2005 | Riedl et al. |
| 2006/0265651 A1 | 11/2006 | Buck |
| 2007/0021065 A1 | 1/2007 | Sengupta et al. |
| 2007/0094083 A1 | 4/2007 | Yruski et al. |
| 2007/0260521 A1 | 11/2007 | Van Der Riet |
| 2008/0127246 A1 | 5/2008 | Sylvain |
| 2008/0243610 A1 | 10/2008 | Ragno et al. |
| 2008/0276270 A1 | 11/2008 | Kotaru et al. |
| 2008/0307351 A1 | 12/2008 | Louch et al. |
| 2009/0132276 A1 | 5/2009 | Petera |
| 2009/0132339 A1 | 5/2009 | Sloo et al. |
| 2009/0320073 A1 | 12/2009 | Reisman |
| 2010/0013997 A1 | 1/2010 | Hwang |
| 2010/0046606 A1 | 2/2010 | Celik et al. |
| 2010/0095317 A1 | 4/2010 | Toebes et al. |
| 2010/0211966 A1 | 8/2010 | Zhang et al. |
| 2010/0299187 A1 | 11/2010 | Duggal |
| 2011/0016498 A1 | 1/2011 | Tsuria et al. |
| 2011/0072370 A1 | 3/2011 | Mitchell et al. |
| 2011/0106744 A1 | 5/2011 | Becker et al. |
| 2011/0154499 A1 | 6/2011 | Rohan et al. |
| 2011/0270653 A1 | 11/2011 | Gupta et al. |
| 2012/0096486 A1 | 4/2012 | Stallard et al. |
| 2012/0102233 A1 | 4/2012 | Shah et al. |
| 2012/0210349 A1 | 8/2012 | Campana et al. |
| 2012/0324491 A1* | 12/2012 | Bathiche et al. ................ 725/10 |
| 2013/0007793 A1* | 1/2013 | Anthru et al. .................. 725/14 |
| 2013/0144709 A1 | 6/2013 | Narasimhan et al. |
| 2013/0159876 A1 | 6/2013 | Narasimhan et al. |
| 2013/0160036 A1* | 6/2013 | Narsimhan et al. ............ 725/9 |
| 2014/0098293 A1 | 4/2014 | Ishtiaq et al. |
| 2014/0143043 A1 | 5/2014 | Wickramasuriya et al. |
| 2014/0143803 A1 | 5/2014 | Narsimhan et al. |

FOREIGN PATENT DOCUMENTS

| | | |
|---|---|---|
| JP | 2005013713 A | 1/2005 |
| WO | 2008/072739 A1 | 6/2008 |
| WO | 2011032777 A1 | 3/2011 |

OTHER PUBLICATIONS

A. Klaassen "Podbridge Aims to put Fresh Ads in Time-shifted Content", Ad Age digital, Ad & Marketing News, published Aug. 1, 2006, accessed at http://adage.com/article/digital/podbridge-aims-put-fresh-ads-time-shifted-content/110835/ (3 pages).

A.Chianese, et al., "Scene Detection using Visual and Audio Attention", Ambi-sys '08, ACM (7 pages) (Feb. 2008).

B. Carter, "TiVo to Buy Company That Tracks Shopping of TV Viewers", accessed at http://www.nytimes.com/2012/07/17/business/media/tivo-to-buy-tra-which-tracks-buying-habits-of-tv-viewers.html, accessed on May 2, 2013.

B. Schauerte, et al., "Multimodal Saliency-based Attention for Object-based Scene Analysis", International Conference on Intelligent Robots and Systems (IROS),IEEE/RSJ, pp. 1173-1179 (Sep. 2011).

G. Evangelopoulos, et al., "Video Event Detection andSummarization Using Audio, Visual and Text Saliency", IEEE International Conference on Acoustics, Speech and Signal Processing, pp. 3553-3556 (Apr. 2009).

J. Taylor, "Bringing Analytics into Processes Using Business Rules", BPMInstitute.org, accessed at http://www.bpminstitute.org/resources/articles/bringing-analytics-processes-using-business-rules, Monday, Apr. 10, 2006 (3 pages).

M. Mancas, et al., "Human Attention Modelization and Data Reduction", Video Compression, eds. Dr. Amal Punchihewa, InTech, pp. 103-128 (Mar. 2012).

Mediamind "O2 Dual Screen Case Study for Million Pound Drop", accessed at http://www.mediamind.com/resource/o2-dual-screen-case-study-million-pound-drop, downloaded from Internet: Nov. 2012 (5 pages).

P. Baldi, et., "Of bits and wows: A Bayesian theory of surprise with applications to attention", Neural Networks, vol. 23, No. 5, pp. 649-666,(2010).

Q. Chen, et al., "Operational Bi platform for video analytics", Proceedings of the International Conference on Management of Emergent Digital EcoSystems, pp. 180-187, ACM New York, NY, USA 2009, Abstract Only.

S. Kavaldjian, et al., "Generating content presentation according to purpose", IEEE International Conference on Systems, Man and Cybernetics, pp. 2046-2051, Oct. 2009, Abstract Only.

Secondscreen Networks, "The Ad Platform for the Second Screen", accessed at http://www.secondscreen.com/how-it-works, downloaded from internet: Nov. 15, 2012 (3 pages).

Yahoo! Finance, "DG Announces Pioneering Dual-Screen Video Ad Platform", press release: DG—Apr. 2012, accessed at http://financeyahoo.com/news/dg-announces-pioneering-dual-screen-161500829.html (2 pages).

Y-F. Ma, et al., "A User Attention Model for Video Summarization", ACM Multimedia, (10 pages), Dec. 2002.

PCT Search Report & Written Opinion, RE: Application #PCT/US2014/025358; dated Jul. 15, 2014.

S Loeb, "Fluid User Models for Personalized Mobile Apps Overview of the BrightNotes System", IEEE Consumer Communications and networking Conference (CCNC), Jan. 11, 2013, pp. 705-708.

Official Action, Re: Korean Application No. 10-2015-7026580, dated Aug. 9, 2016.

Official Action, RE: Canadian Application No. 2,903,241, dated Oct. 24, 2016.

Official Action Re: Mexican Application No. MX/a/2015/012395, dated Mar. 6, 2017.

* cited by examiner

ATTENTION ESTIMATION TO CONTROL THE DELIVERY OF DATA AND AUDIO/VIDEO CONTENT

BACKGROUND

A multiple system operator (MSO) delivers data and audio/video content to its subscribers. The data content includes, for example, web and Internet data, and multimedia services. The video content includes, for example, television programs, multimedia services, and advertisements. The MSO delivers the video content to its subscribers in an industry-standard format, for example, the Moving Picture Experts Group (MPEG) MPEG-2 transport stream format.

DETAILED DESCRIPTION

The subscriber uses a primary device (e.g., set top box, personal computer, entertainment device, or digital media server) to receive data and audio/video content from the MSO. Since the typical subscriber is acquiring more mobile, or secondary, devices (e.g., tablet computer, laptop computer, or smartphone), the challenge for the MSO is to deliver the data and audio/video content to both the subscriber's primary, and secondary, devices.

The subscriber typically uses the primary device to receive video content (e.g., television programs, multimedia services, or advertisements). The subscriber may also use the secondary device, separate from the primary device, to receive data and audio/video content (e.g., an Internet search, or access to secondary multimedia content). When the subscriber is viewing the primary media content on the primary device while also operating the secondary device to receive secondary content that relates to the primary media content, the MSO delivers the primary media content and the secondary content using a parallel feed application. One exemplary parallel feed application is the subscriber receiving a movie on the primary device, and using the secondary device to receive, for example, information about the cast and crew who worked on the movie, director's-cut scenes, or alternative endings. Another exemplary parallel feed application is the subscriber receiving a television series program on the primary device, and using the secondary device to receive, for example, episode and season information, targeted advertising, or any other information related to the television series program.

Attention estimation, or attention modeling, is a method of estimating the attention that a viewer would pay to specific portions of some media content (e.g., video) based on physiological and psychological understanding of human perception and cognition. A focus of attention estimation involves estimating attention of a viewer based primarily on audio and visual features extracted from the media content. Some conventional applications include video compression and coding, video summarization and highlight generation, video event detection, video segmentation and scene detection, and robotic vision. These conventional applications have not included controlling the presentation or pacing of supplemental information in a parallel feed application.

Some conventional solutions involve "surprise modeling" as related to media content, that is, estimating the amount of surprise elicited in a viewer by specific portions of media content such as video. These conventional solutions utilize a mathematical model to quantify surprise based on the Bayesian theory of probability, by measuring the differences between prior and posterior probability distributions of hypothesis models of the video content, based on salient visual or auditory features calculated around an event. Since these conventional solutions have shown that viewers tend to orient their attention to surprising items or events in media content, surprise modeling is applicable to addressing the problem of attention estimation. The conventional applications of surprise modeling are essentially the same as those discussed above for attention estimating. Furthermore, these conventional applications have not included the use of surprise modeling to control the presentation or pacing of supplemental information in a parallel feed application.

Some other conventional solutions involve the control of the presentation and pacing of content in a parallel feed application using methods based on audio and visual features extracted from media content. These other conventional solutions include controlling the presentation of secondary content using "activity detection" (i.e., detecting the level of activity or action in video content), based on such criteria as the number or speed of objects moving in a video, or the level of noise in the audio track. These other conventional solutions also examine visual or audio features that are indicative of activity, such as the number of bytes per video frame, the occurrence of I, P, and B frames, the occurrence of shot boundaries, and the like. These other conventional solution also use activity detection, based on extracted visual and audio features, to control the placement and number of still images captured from the video being analyzed, to aid in post-production video editing tasks.

The conventional solutions described above illustrate that a relationship exists between activity detection and attention estimation. However, a viewer draws their attention to portions of video content based on additional things other than simply a level of "activity". Examples of features that pertain to attention estimation, rather than activity detection, include: highly contrasting or vivid objects, or regions, in the visual field; a sudden change of the visual field from one predominant color or texture to another (e.g., from a forest scene to a desert scene); a prominently positioned face, object, or text field appearing in the visual frame; a static scene which appears directly after a camera pan or zoom; unusual or distinctive sounds in the audio track (e.g., laughter or applause, crying, or menacing growls); and, a change of the audio track from one type of sound to another, even if at similar audio levels (e.g., a change from street crowd noises to car noises). Thus, attention estimation provides a much more accurate and comprehensive basis for the control of supplemental parallel feeds than activity detection alone.

When the MSO is delivering primary content and secondary content in parallel, the shortcomings of the conventional solutions do not allow the MSO to optimally control the presentation and pacing of the secondary content concurrent with the primary content. To improve the user experience, the focus for the MSO is on attracting and holding the viewer's attention, and avoiding distraction of the viewer's attention away from the primary content at inappropriate times.

Figure 1:
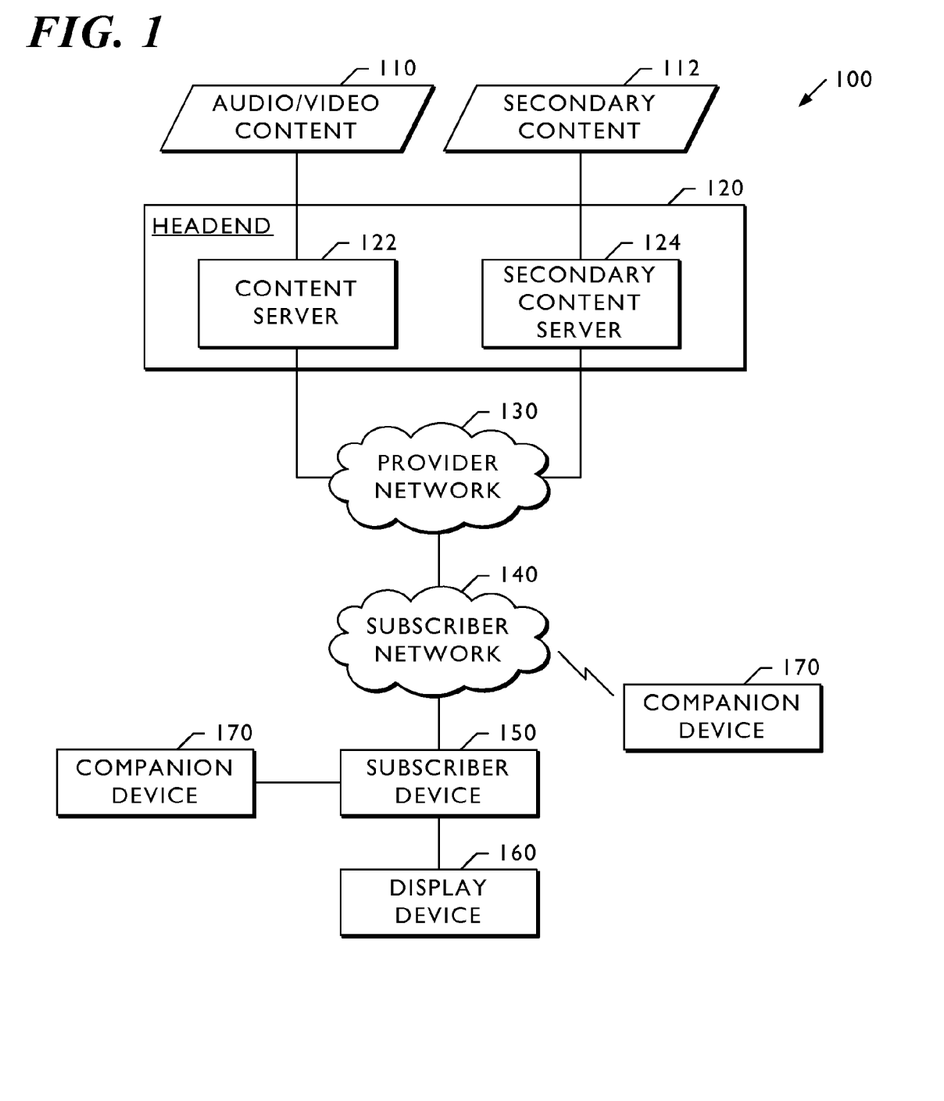
FIG. 1 is a block diagram that illustrates one embodiment of the hardware components of an attention estimation system.

FIG. 1 is a block diagram that illustrates one embodiment of the hardware components of an attention estimation system 100. The headend 120 is a master facility for the MSO that includes a content server 122 and secondary content server 124. The content server 122 receives audio/video content 110 generated from external sources, and distributes the audio/video content 110 to the MSO subscribers. The secondary content server 124 receives secondary content 112 generated from external sources, and distributes the secondary content 112 to the MSO subscribers. In another embodiment, the secondary content server 124 is a separate component from the headend 120, such as a web server.

A provider network 130 connects the headend 120 to a subscriber network 140. In one embodiment, the provider network 130 is a hybrid-fiber coaxial (HFC) broadband network that combines optical fiber and coaxial cable that the MSO uses to deliver television programming and network services to a subscriber's premises. The subscriber network 140 connects a subscriber device 150 to the provider network 130. In one embodiment, the subscriber network 140 is a local area network that combines wired and wireless technology to distribute the high-definition television programming and network services from the MSO to client devices throughout the subscriber's premises.

The provider network 130 and subscriber network 140 are data and audio/video content networks providing two-way communication between the headend 120 and the subscriber device 150. The downstream communication path is from the headend 120 to the subscriber device 150. The upstream communication path is from the subscriber device 150 to the headend 120.

The subscriber device 150 is a computing device, such as a gateway set top box, set top box, personal computer, entertainment device, or digital media server. The subscriber device 150 connects to a display device 160 (e.g., a digital television) to display the audio/video content 110 provided by the headend 120. When the headend 120 is delivering the audio/video content 110 as a parallel feed, the subscriber device 150 receives the primary media content, and the display device 160 displays the primary media content to the subscriber. Even though FIG. 1 shows the subscriber device 150 and display device 160 as separate components, one skilled in the art will understand that the subscriber device 150 and the display device 160 may be a single integrated component.

A companion device 170 is a computing device, such as a tablet computer, smartphone, mobile phone, gaming console, or handheld device. The subscriber may connect the companion device 170 either to the subscriber device 150 via a wired or wireless connection, or to the subscriber network 140 via a wired or wireless connection. When the headend 120 is delivering the audio/video content 110 as a parallel feed, the companion device 170 receives, and displays, the secondary content to the subscriber.

Figure 2:
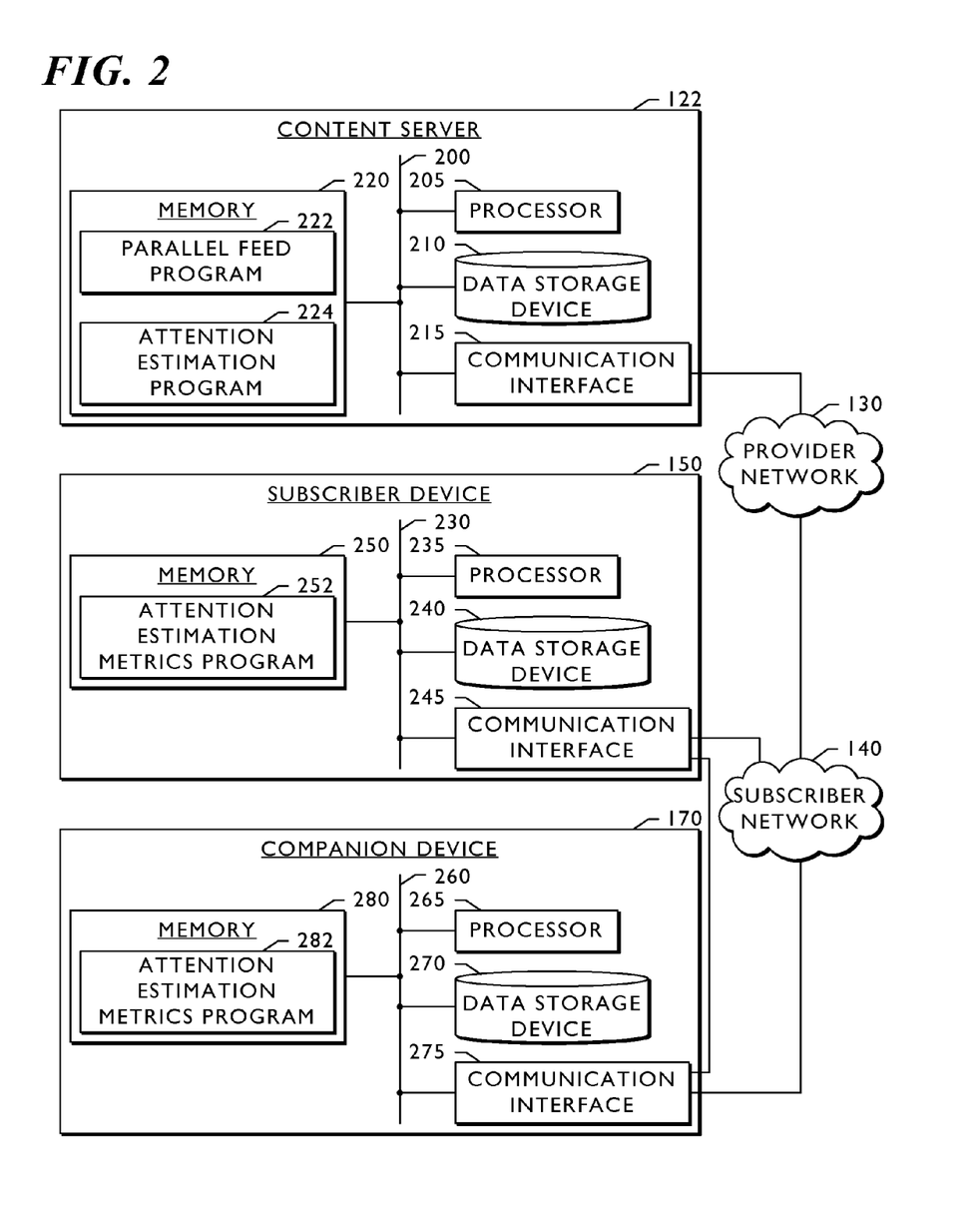
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. Specifically, FIG. 2 illustrates, in detail, one embodiment of the content server 122, subscriber device 150, and companion device 170.

The content server 122 shown in FIG. 2 is a general-purpose computer. A bus 200 is a communication medium connecting a processor 205, data storage device 210 (such as a serial ATA (SATA) hard disk drive, optical drive, small computer system interface (SCSI) disk, flash memory, or the like), communication interface 215, and memory 220 (such as random access memory (RAM), dynamic RAM (DRAM), non-volatile computer memory, flash memory, or the like). The communication interface 215 allows for two-way communication of data and content between the content server 122, subscriber device 150, and companion device 170 via the provider network 130 and subscriber network 140.

The processor 205 of the content server 122 performs the disclosed methods, or portions of the disclosed methods, by executing sequences of operational instructions that comprise each computer program resident in, or operative on, the memory 220. The reader should understand that the memory 220 may include operating system, administrative, and database programs that support the programs disclosed in this application. In one embodiment, the configuration of the memory 220 of the content server 122 includes a parallel feed program 222, and an attention estimation program 224. The parallel feed program 222, as described above, performs the delivery of the primary media content to the subscriber device 150 and the secondary content to the companion device 170. The attention estimation program 222 performs the method disclosed in the exemplary embodiment depicted in FIG. 3. When the processor 205 performs the disclosed method, it stores intermediate results in the memory 220 or data storage device 210. In another embodiment, the processor 205 may swap these programs, or portions thereof, in and out of the memory 220 as needed, and thus may include fewer than all of these programs at any one time.

The subscriber device 150 shown in FIG. 2 is a computing device that includes a general-purpose computer. A bus 230 is a communication medium connecting a processor 235, data storage device 240 (such as a serial ATA (SATA) hard disk drive, optical drive, small computer system interface (SCSI) disk, flash memory, or the like), communication interface 245, and memory 250 (such as random access memory (RAM), dynamic RAM (DRAM), non-volatile computer memory, flash memory, or the like). The communication interface 245 allows for two-way communication of data and content between the subscriber device 150 and companion device 170, and between the subscriber device 150, content server 122, and companion device 170 via the provider network 130 and subscriber network 140.

The processor 235 of the subscriber device 150 performs the disclosed methods, or portions of the disclosed methods, by executing sequences of operational instructions that comprise each computer program resident in, or operative on, the memory 250. The reader should understand that the memory 250 may include operating system, administrative, and database programs that support the programs disclosed in this application. In one embodiment, the configuration of the memory 250 of the subscriber device 150 includes an attention estimation metrics program 252. The attention estimation metrics program 252 performs the method disclosed in the exemplary embodiment depicted in FIG. 3. When the processor 235 performs the disclosed method, it stores intermediate results in the memory 250 or data storage device 240. In another embodiment, the processor 235 may swap these programs, or portions thereof, in and out of the memory 250 as needed, and thus may include fewer than all of these programs at any one time.

The companion device 170 shown in FIG. 2 is a computing device that includes a general-purpose computer. A bus 260 is a communication medium connecting a processor 265, data storage device 270 (such as a serial ATA (SATA) hard disk drive, optical drive, small computer system interface (SCSI) disk, flash memory, or the like), communication interface 275, and memory 280 (such as random access memory (RAM), dynamic RAM (DRAM), non-volatile computer memory, flash memory, or the like). The communication interface 275 allows for two-way communication of data and content between the companion device 170, and subscriber device 150, and between the companion device 170, content server 122, and subscriber device 150 via the provider network 130 and subscriber network 140.

The processor 265 of the companion device 170 performs the disclosed methods, or portions of the disclosed methods, by executing sequences of operational instructions that comprise each computer program resident in, or operative on, the memory 280. The reader should understand that the memory 280 may include operating system, administrative, and database programs that support the programs disclosed in this application. In one embodiment, the configuration of the memory 280 of the companion device 170 includes an attention estimation metrics program 282. The attention estimation metrics program 282 performs the method disclosed in the exemplary embodiment depicted in FIG. 3. When the processor 265 performs the disclosed method, it stores intermediate results in the memory 280 or data storage device 270. In another embodiment, the processor 265 may swap these programs, or portions thereof, in and out of the memory 280 as needed, and thus may include fewer than all of these programs at any one time.

A current focus for the MSO is to control the presentation and pacing of the secondary content on the companion device 170 for a subscriber who is concurrently viewing the primary media content on the subscriber device 150. The MSO controls the presentation (e.g., an amount, format, or quality of the content) and pacing (e.g., refresh rate or current or new data) by estimating the subscriber's attention to the primary media content, where the calculation of the attention estimate examines visual, audio, and/or textual features extracted from the primary media content. In one embodiment, the generation of the attention estimates is in the form of an "attention timeline" that provides a quantitative indication, or measurement, of estimated attention level (e.g., on a scale from zero to one-hundred) as a function of time.

The visual features extracted from the primary media content include those indicative of: overall motion (e.g., number of pixel differences between adjacent frames; percentage of the total frame in motion; and the mean magnitude of motion vectors); camera motion, such as pans left or right, or zooms in or out (detected by, for example, motion vectors of background macro-blocks; and the speed or intensity of motion based on the magnitude of motion vectors, noting that the focus of attention may not be on the camera motion itself, but on when and where the motion ends); local motion of objects in the foreground, especially if in the center of the frame (detected via, for example, regions of motion vectors versus background motion due to camera movement; size of the regions, magnitude of the relevant motion vectors; and spatial and temporal consistency checks to detect object coherency); statistical rhythm of scenes (e.g., frequency of shot cuts; percentage of IMBs in frame; and energy of residual error blocks); visual contrast of static or moving objects (e.g., contrasts in luminance or intensity, color, edge orientation; variance of pixel hue across a macro-block); special scenes or objects (e.g., faces—their size, number, location in the frame, and percentage of the frame area they occupy; captions, and their relative size in the frame; genre-specific attention objects such as the ball in a soccer game); visual markers or logos indicating upcoming segments or transitions (e.g., markers denoting sports or weather segments in news shows); and shot type (e.g., close-up versus long shot; and crowd shots versus playing field shots).

The audio features extracted from the primary media content include: overall volume or baseband energy, and sharp changes in volume; time-frequency decomposition of the audio signal (e.g., intensity, frequency contrast, and temporal contrast; mean energy, amplitude, and frequency of primary filtered frequency components versus time); auditory surprise (e.g., as based on the Bayesian Surprise model); speech detection (e.g., excitement detection of speech—speech pitch, speech band energy, zero-crossing measures); music detection (e.g., changes in music volume; strength and tempo of music rhythm or beat); audio markers or music indicating upcoming segments or transitions (e.g., signature music themes or jingles denoting key events, show segments, and the like); and laughter and applause detection (noting that the focus of attention may be on the scene occurring just before the detection).

The textual features extracted from the primary media content include: closed-caption or subtitle indications of audio events (e.g., [Laughter], [Whispering], [Screaming], [Gunshot], [Loud noise], and the like); semantic information derived from closed-captioned or subtitled dialogue; and textual information derived from screen scrapping or optical character recognition (OCR) of visual content.

Some conventional solutions on attention modeling aim at detecting spatial regions within a visual frame that would serve as the focus of a viewer's attention, for applications such as video compression where lower compression levels would be used for high-attention regions. In a parallel feed application, in which the secondary content is presented on a second screen such as a companion device, the aim of attention modeling is in the overall level attention directed at the primary screen, and away from the second screen, by the viewer. In another embodiment, secondary content may be displayed on the primary screen in overlay fashion (e.g., as "pop-up" labels overlaid on the primary content identifying persons and objects in the visual frame). In these embodiments, spatial region attention modeling becomes more important because you want to avoid overlaying information on an area where the viewer's attention is focused. In this case, an "attention map" that corresponds to the visual frame controls the placement of the information, as well as the timeline to control the pacing of the information.

In one embodiment, the attention modeling utilizes additional information about a subscriber (e.g., personal profile data, viewing preferences) in conjunction with some high-level semantic information that it derives from low-level extracted features. This additional information is useful to weight the attention modeling, thereby personalizing the attention modeling to the subscriber. For example, if the high-level detectors determine that a subscriber is watching a show related to sports, the attention modeling warrants a higher level of estimated attention if the subscriber's profile indicates that they "like" sports. In addition, the subscriber's past viewing history may augment the profile preferences. For example, if the high-level detectors determine that a subscriber is watching a specific show related to sports, and the subscriber's past viewing history indicates that they viewed a similar or identical sports show earlier that day, the attention modeling warrants a lower attention level estimate. This implies a different attention estimate timeline for each viewer, requiring the attention estimation module in the backend system to have access to stored user profile information.

Relevant attention indicators of high-level semantic information derived from low-level features include: commercial detection; genre (e.g., sports, and comedy) or sub-genre (e.g., football, and baseball) detection; object or event detection (e.g., touchdown, goal, changes in score, or the like in a sporting event). Such semantic information would be most useful in conjunction with user profile information in order to personalize the attention model.

In another embodiment, the attention estimation is based, in part, on whether the subscriber is interacting with the parallel feed application on the companion device 170. If the attention estimation determines that the subscriber is currently interacting with the companion device 170 (e.g., by detecting keystrokes or mouse usage, or using sensors on the companion device, such as accelerometers, cameras, or the like) or the subscriber's ability to operate the companion device 170 has changed (e.g., by detection of device lock, screen saver, or the like), the attention estimation applies a greater weighting to audio features (or audio-related textual features like closed captioning or subtitles) on the subscriber device 150 when calculating the attention level. This is based on the assumption that since the user is interacting with the companion device 170, he is not looking at the subscriber device 150. Conversely, if the subscriber is not interacting with the companion device 170, greater weighting would go to visual features on the subscriber device 150 when calculating the attention level. In one embodiment, the attention estimation controls the delivery of the secondary content to the companion device 170 based on the interaction measurement received from the companion device 170. In another embodiment, the attention estimation controls the delivery of the primary content to the subscriber device 150 based on the interaction measurement received from the companion device 170. These features of the attention modeling imply personalized attention estimate timelines for each subscriber that would additionally involve dynamic weighting of the different modalities. In one embodiment, the attention modeling employs separate timelines for each modality (e.g., audio/textual, and visual) generated in the headend 120, then has the final fusion of the timelines, with dynamic weighting, performed locally (e.g., in the companion device 170).

Figure 3:
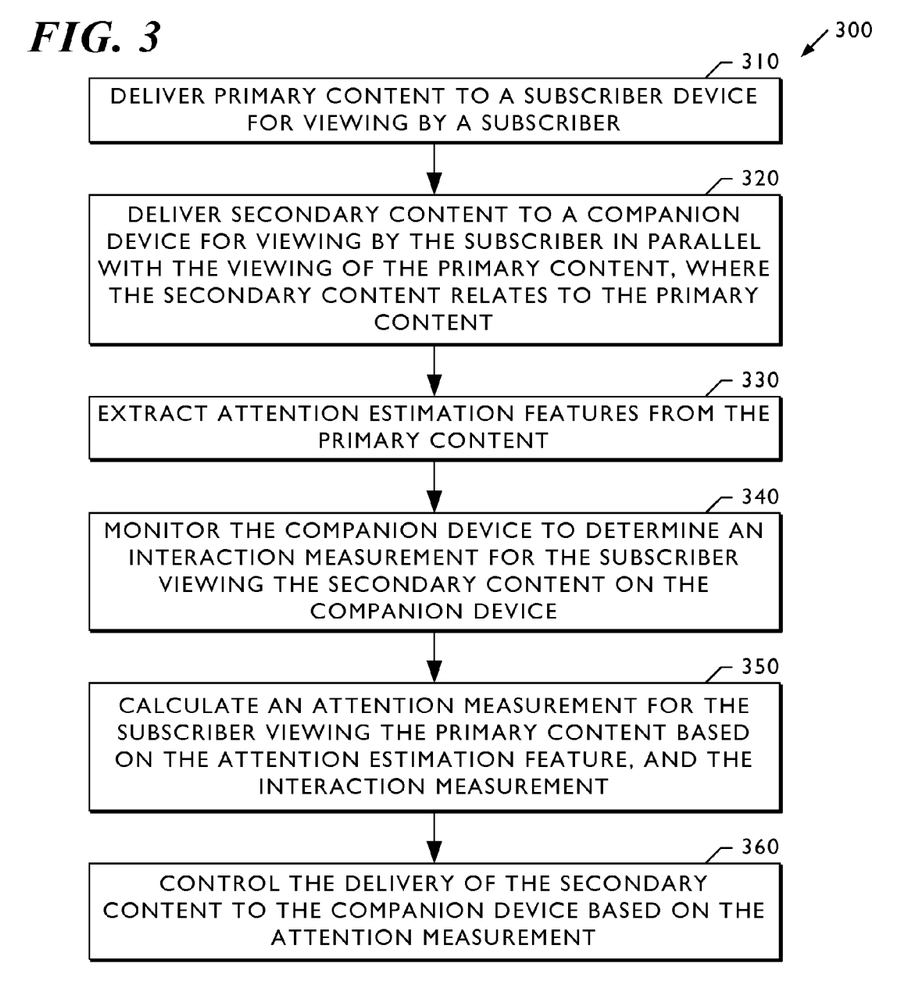
FIG. 3 is a flow diagram that illustrates one embodiment of a method performed by the attention estimation system shown in FIG. 1.

FIG. 3 is a flow diagram that illustrates one embodiment of a method performed by the attention estimation system shown in FIG. 1. The process 300, with reference to FIG. 1 and FIG. 2, begins when the content server 122 on the headend 120 delivers primary content to the subscriber device 150 for viewing on the display device 160 by the subscriber (step 310). The content server 122 then delivers the secondary content to the companion device 170 for viewing by the subscriber in parallel with the viewing of the primary content, where the secondary content relates to the primary content (step 320).

The attention estimation program 224 on the content server 122 periodically extracts attention estimation features from the primary content (step 330). In various embodiments, the attention estimation features are at least one of visual, audio, and textual features that are present in the audio/video content 110. In one embodiment, the attention estimation program 224 retrieves user profile information for the subscriber to personalize the attention model, particularly for high-level semantically meaningful information. In another embodiment, the attention estimation program 224 retrieves past viewing history for the subscriber to further refine the attention model.

The attention estimation program 224 on the content server 122 also periodically monitors the companion device 170 to determine an interaction measurement for the subscriber viewing the secondary content on the companion device 170 (step 340). In one embodiment, the attention estimation metrics program 282 on the companion device 170 periodically collects measurements from sensors on the companion device 170, interprets those measurements, and sends the interaction measurement to the attention estimation program 224 on the content server 122. In another embodiment, the attention estimation metrics program 282 on the companion device 170 periodically collects measurements from sensors on the companion device 170, and computes compute the interaction measurement.

The attention estimation program 224 on the content server 122 then calculates an attention measurement for the subscriber viewing the primary content based on the attention estimation feature extracted from the primary content, and the interaction measurement (step 350). In one embodiment, the attention measurement is a weighted fusion of multiple indicators from a media analysis framework (MAF). For example, the attention measurement may be a weighted fusion of multiple video event detector (VED) indicators (such as, cut frequency, scene changes, and camera and overall motion), and multiple audio event detector (AED) indicators (such as, volume and volume change, and significant audio events).

Relevant methods for fusing attention indicators of different modes to create an overall attention estimate include: weighted fusion of attention scores for various detectors (e.g., weighting based on genre or show; static weighting; dynamic weighting, with greater weighting applied if there is higher variability in a given detector's values, or if one or more features deviate significantly from a mean value; and weighting features based on entropy, that is, the negative logarithm of the probability of a value occurring); and weighted fusion based on whether the viewer is interacting with the companion device (e.g., user interaction could be determined by the parallel feed client application; increased interaction with the companion device would cause greater weighting to audio, and audio-associated textual, portions; and non-interaction with the companion device would cause greater weighting to visual portion).

The attention estimation program 224 on the content server 122 then controls the delivery of the secondary content to the companion device 170 based on the attention measurement (step 360). By controlling the delivery of the secondary content, the attention estimation system allows presentation and pacing of the secondary content on the companion device 170 in a manner that does not detract from the subscriber's experience viewing the primary content on the subscriber device 150.

One skilled in the art will understand that some or all of the steps in calculating the attention estimate may be performed prior to the delivery of the primary and secondary content to the MSO subscribers, if the primary content is available at the headend for feature extraction and processing at a prior time.

Although the disclosed embodiments describe a fully functioning method implemented in a computer system for controlling the delivery of data and audio/video content, the reader should understand that other equivalent embodiments exist. Since numerous modifications and variations will occur to those reviewing this disclosure, the method implemented in a computer system for controlling the delivery of data and audio/video content is not limited to the exact construction and operation illustrated and disclosed. Accordingly, this disclosure intends all suitable modifications and equivalents to fall within the scope of the claims.

We claim:

1. A computing device for controlling the delivery of data and audio/video content, comprising:

a communication interface that connects the computing device to a network that connects to a subscriber device, and a companion device;
a memory device resident in the computing device; and
a processor disposed in communication with the communication interface and the memory device, the processor configured to:
deliver primary content to the subscriber device for viewing by a subscriber;
deliver secondary content to the companion device for viewing by the subscriber in parallel with the subscriber viewing the primary content, the secondary content relating to the primary content;
extract at least one attention estimation feature from the primary content;
monitor the companion device to determine an interaction measurement for the subscriber viewing the secondary content on the companion device;
calculate an attention measurement for the subscriber viewing the primary content based on said at least one attention estimation feature, and the interaction measurement; and
control the delivery of the secondary content to the companion device based on the attention measurement.

2. The computing device of claim 1, wherein each of said at least one attention estimation feature is at least one of a visual feature in the primary content, an audio feature in the primary content, and a textual feature in the primary content.

3. The computing device of claim 1, wherein to extract said at least one attention estimation feature from the primary content, the processor is further configured to:
retrieve a personal profile and viewing preferences for the subscriber;
compute a weight for each of said at least one attention estimation feature based on the personal profile and viewing preferences for the subscriber,
wherein the calculation of the attention measurement for the subscriber includes the weight for each said at least one attention estimation feature.

4. The computing device of claim 1, wherein to extract said at least one attention estimation feature from the primary content, the processor is further configured to:
retrieve a past viewing history for the subscriber;
compute a weight for each of said at least one attention estimation feature based on the past viewing history for the subscriber,
wherein the calculation of the attention measurement for the subscriber includes the weight for each of said at least one attention estimation feature.

5. The computing device of claim 1, wherein to monitor the companion device, the processor is further configured to:
receive a measurement from the companion device,
wherein the measurement is at least one of an ability of the subscriber to interact with the companion device, and an operation of the companion device by the subscriber.

6. The computing device of claim 1, wherein to calculate the attention measurement, the processor is further configured to:
calculate a weight for each of said at least one attention estimation feature; and
adjust the weight for each of said at least one attention estimation feature based on the interaction measurement.

7. The computing device of claim 1, wherein to calculate the attention measurement, the processor is further configured to:
calculate a weight for each of said at least one attention estimation feature; and
calculate a weight for the interaction measurement,
wherein the attention measurement is a fusion of the weighted said at least one attention estimation feature, and the weighted interaction measurement.

8. The computing device of claim 1, wherein the attention measurement is based on said at least one attention estimation feature, and the interaction measurement as a function of time.

9. The computing device of claim 1, wherein to control the delivery of the secondary content, the processor is further configured to:
adjust presentation or pacing of delivery of the secondary content to the companion device based on the attention measurement.

10. The computing device of claim 1, wherein the processor is further configured to:
control the delivery of the primary content to the subscriber device based on the attention measurement.

11. A method implemented in a computer system for controlling the delivery of data and audio/video content, comprising:
delivering primary content to a subscriber device for viewing by a subscriber;
delivering secondary content to a companion device for viewing by the subscriber in parallel with the subscriber viewing the primary content, the secondary content relating to the primary content;
extracting at least one attention estimation feature from the primary content;
monitoring the companion device to determine an interaction measurement for the subscriber viewing the secondary content on the companion device;
calculating an attention measurement for the subscriber viewing the primary content based on said at least one attention estimation feature, and the interaction measurement; and
controlling the delivery of the secondary content to the companion device based on the attention measurement.

12. The method of claim 11, wherein each of said at least one attention estimation feature is at least one of a visual feature in the primary content, an audio feature in the primary content, and a textual feature in the primary content.

13. The method of claim 11, wherein the extracting of said at least one attention estimation feature from the primary content further comprises:
retrieving a personal profile and viewing preferences for the subscriber;
computing a weight for each of said at least one attention estimation feature based on the personal profile and viewing preferences for the subscriber,
wherein the calculation of the attention measurement for the subscriber includes the weight for each of said at least one attention estimation feature.

14. The method of claim 11, wherein the extracting of said at least one attention estimation feature from the primary content further comprises:
retrieving a past viewing history for the subscriber;
computing a weight for each of said at least one attention estimation feature based on the past viewing history for the subscriber, wherein the calculation of the attention measurement for the subscriber includes the weight for each of said at least one attention estimation feature.

15. The method of claim 11, wherein the monitoring of the companion device further comprises:
   receiving a measurement from the companion device,
   wherein the measurement is at least one of an ability of the subscriber to interact with the companion device, and an operation of the companion device by the subscriber.

16. The method of claim 11, wherein the calculating of the attention measurement further comprises:
   calculating a weight for each of said at least one attention estimation feature; and
   adjusting the weight for each of said at least one attention estimation feature based on the interaction measurement.

17. The method of claim 11, wherein the calculating of the attention measurement further comprises:
   calculating a weight for each of said at least one attention estimation feature; and
   calculating a weight for the interaction measurement,
   wherein the attention measurement is a fusion of the weighted said at least one attention estimation feature, and the weighted interaction measurement.

18. The method of claim 11, wherein the attention measurement is based on said at least one attention estimation feature, and the interaction measurement as a function of time.

19. The method of claim 11, wherein the controlling of the delivery of the secondary content further comprises:
   adjusting presentation or pacing of delivery of the secondary content to the companion device based on the attention measurement.

20. The method of claim 11, further comprising:
   controlling the delivery of the primary content to the subscriber device based on the attention measurement.

21. A non-transitory computer-readable medium, comprising computer-executable instructions that, when executed on a computing device, perform steps of:
   delivering primary content to a subscriber device for viewing by a subscriber;
   delivering secondary content to a companion device for viewing by the subscriber in parallel with the subscriber viewing the primary content, the secondary content relating to the primary content;
   extracting at least one attention estimation feature from the primary content;
   monitoring the companion device to determine an interaction measurement for the subscriber viewing the secondary content on the companion device;
   calculating an attention measurement for the subscriber viewing the primary content based on said at least one attention estimation feature, and the interaction measurement; and
   controlling the delivery of the secondary content to the companion device based on the attention measurement.

\* \* \* \* \*